United States Patent
Zhu et al.

(10) Patent No.: US 6,876,556 B2
(45) Date of Patent: Apr. 5, 2005

(54) ACCELERATED COMMUTATION FOR PASSIVE CLAMP ISOLATED BOOST CONVERTERS

(75) Inventors: Lizhi Zhu, Canton, MI (US);
Jih-Sheng Lai, Blacksburg, VA (US);
Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 35 days.

(21) Appl. No.: 10/118,659

(22) Filed: Apr. 8, 2002

(65) Prior Publication Data

US 2003/0002304 A1 Jan. 2, 2003

Related U.S. Application Data

(63) Continuation of application No. 09/865,099, filed on May 24, 2001, now Pat. No. 6,452,815.
(60) Provisional application No. 60/270,703, filed on Feb. 22, 2001.

(51) Int. Cl.[7] .............................................. H02M 3/335
(52) U.S. Cl. .................... 363/17; 363/56.05; 363/56.02
(58) Field of Search .............................. 363/17, 26, 39, 363/40, 49, 56.02, 56.05, 56.06, 56.08, 98, 127, 132, 133; 361/91.7

(56) References Cited

U.S. PATENT DOCUMENTS

| | | | | |
|---|---|---|---|---|
| 3,818,313 A | * | 6/1974 | Rosenstein et al. | 363/132 |
| 3,986,097 A | | 10/1976 | Woods | 321/2 |
| 4,953,068 A | | 8/1990 | Henze | 363/17 |
| 5,745,351 A | | 4/1998 | Taurand | 363/20 |
| 5,991,670 A | | 11/1999 | Mufford et al. | 701/22 |
| 6,191,957 B1 | | 2/2001 | Peterson | 363/17 |
| 6,452,815 B1 | * | 9/2002 | Zhu et al. | 363/17 |

* cited by examiner

Primary Examiner—Jessica Han
(74) Attorney, Agent, or Firm—Seed IP Law Group PLLC

(57) ABSTRACT

An efficient and cost effective bidirectional DC/DC converter reduces switch voltage stress via accelerated commutation allowing use of a low-cost passive clamp circuit in boost mode. The converter includes a primary circuit, transformer and secondary circuit. The primary circuit takes the form of a "full bridge converter," a "push-pull converter," or an "L-type converter.". The primary circuit may include a dissipator such as a snubber circuit or small buck converter. A secondary side of the transformer is momentarily shorted by the secondary circuit by, for example, turning on at least two switches in the secondary circuit simultaneously for a minimal calibratable period when a pair of primary circuit controllers turn off to protect the primary circuit switches from voltage spikes during switching conditions.

64 Claims, 11 Drawing Sheets

ACCELERATED COMMUTATION FOR PASSIVE CLAMP ISOLATED BOOST CONVERTERS

This continuation of U.S. application Ser. No. 09/865,099, filed May 24, 2001 now U.S. Pat. No. 6,452,815 and titled "Accelerated Commutation for Passive Clamp Isolated Boost Converters", incorporated herein by reference in its entirety, which is the non-provisional application of provisional patent application No. 60/270,703 titled, "Accelerated Commutation for Passive Clamp Isolated Boost Converters," filed Feb. 22, 2001.

BACKGROUND OF THE INVENTION

1. Field of the Invention

The present invention relates generally to a DC/DC converter.

2. Discussion of the Prior Art

The need to reduce fossil fuel consumption and emissions in automobiles and other vehicles predominately powered by internal combustion engines (ICEs) is well known. Vehicles powered by electric motors attempt to address these needs.

Typically, a vehicle propelled by an electric motor can use batteries or fuel cells to generate the necessary current. Fuel cells generate electrical power through an electrochemical reaction of a fuel and oxidant, such as hydrogen and oxygen. Water is the product of the electrochemical reaction in a fuel cell utilizing hydrogen and oxygen, a product that is easily disposed. See generally, U.S. Pat. No. 5,991,670 to Mufford.

The desirability of using electric motors to propel a vehicle is clear. There is great potential for reducing vehicle fuel consumption and emissions with no appreciable loss of vehicle performance or drive-ability. Nevertheless, new ways must be developed to optimize these potential benefits.

One such area of electric vehicle (EV) development is converting direct current (DC) from generating devices such as fuel cells and high voltage (HV) batteries to an appropriate current for driving a load. Ideally, the current generators (such as HV batteries or fuel cells) and loads (such as vehicle 12V powered accessories) would all be at the same voltage level. Unfortunately, this is not presently the case. For example, electric vehicles typically employ a dual-voltage power system, including a conventional 12V voltage system to power conventional 12V loads such as lights, sensors and controllers and a high voltage bus (for example 300V) to power the traction inverter and motor. It is particularly advantageous if energy can to be transferred bi-directionally between the two voltage systems.

Therefore, a successful implementation of electric traction motor propelled vehicles may require an effective bidirectional DC/DC converter. A bi-directional converter may allow the high voltage bus to be used as a current load during start-up or as a current generator, for example during a breaking or slowing of the vehicle. Similarly, a bidirectional converter may allow the 12V battery to be used as a current generator or as a load while charging. Unidirectional and bi-directional DC/DC converters are known. See generally, U.S. Pat. No. 5,745,351 to Taurand and U.S. Pat. No. 3,986,097 to Woods.

In a bidirectional DC/DC converter, the primary side of the transformer can be current-fed and the secondary side can be voltage-fed. The primary side normally experiences a high voltage overshoot when turning a pair of switches off, such as when turning off a pair of switching diodes diagonally opposed across from one another in a bridge circuit. This voltage spike needs to be clamped to avoid the voltage overshoot passing through the switching devices. A passive clamp converter employs a diode and a capacitor to absorb excessive energy from the voltage overshoot and a resistor to dissipate the absorbed energy. Unfortunately, the use of a simple prior art passive-clamped snubber circuit results in severe limitation in a low voltage (e.g., 12V), high current (e.g., hundreds of amperes) application due to significant power loss, although it is a simple approach widely used to resolve the voltage spike issue.

An active clamp in the prior art replaces the resistor in the passive clamp circuit with a switch to pump back the energy to the source when the capacitor is not absorbing energy. This recycles the dissipated energy and improves efficiency, but this technology is expensive to implement.

In the prior art, bidirectional flyback converters are known to be best suited for low power applications. DC/DC converters for use in automobiles must be able to withstand the extreme environmental conditions and higher power requirements experienced by many vehicles. Therefore, there is a desire and a need for an efficient and cost effective high power bidirectional DC/DC converter.

SUMMARY OF THE INVENTION

Accordingly, an object of the present invention is to provide an efficient and cost effective high power bidirectional DC/DC converter that can withstand the vigorous environment of an automobile.

In one aspect a method and system to accelerate commutation for passive-clamped isolated high power boost converters includes a primary circuit having at least one pair of diagonal controllers (such as switched diodes); a secondary circuit comprising at least two controllers (such as switched diodes); a one directional or bidirectional transformer connected to the primary circuit and the secondary circuit. The primary circuit may also having a snubber circuit comprising a clamping diode, a clamping capacitor and an energy dissipater such as a resistor. In another aspect a small buck converter can replace the resistor to increase efficiency. The clamping diode can be electrically coupled in a "bridge," "push-pull," or "L" configuration. The commutation of the present invention protects the primary circuit switches from voltage spikes in a boost mode.

The present invention shorts the secondary circuit by turning on at least two switches in the secondary circuit simultaneously for a minimal calibratable period (for example, 2 microseconds) while a pair of switch devices in the primary circuit turn off, whereby the primary circuit current can be transferred to the secondary circuit quickly and reduce a voltage spike due to primary current and transformer leakage interaction.

The present invention also has a means to allow a smooth transition between a choke (inductor) current and a transformer primary current. Primary current increases linearly through the snubber circuit during switching conditions, thus protecting the primary circuit controllers.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

Figure 1:
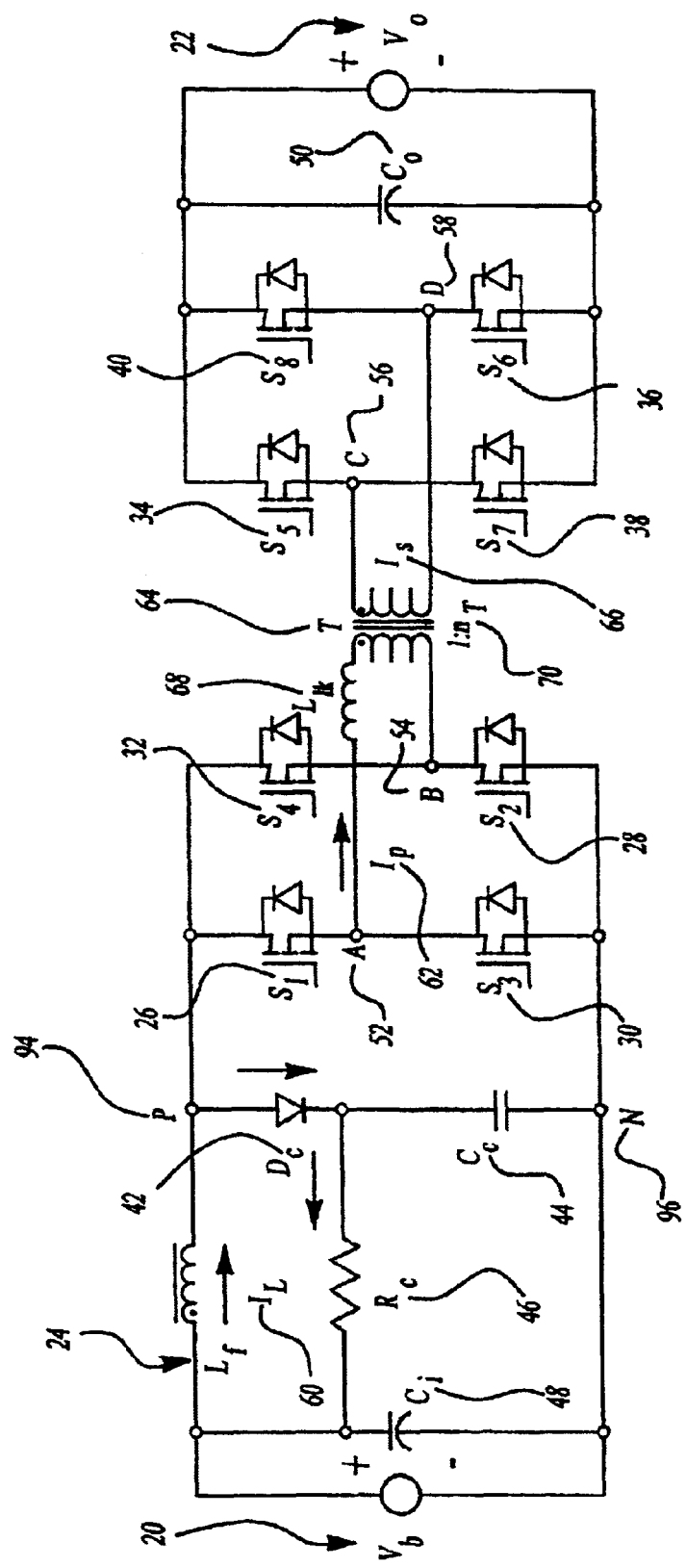
FIG. 1 illustrates a bidirectional full-bridge DC/DC converter with Accelerated Commutation for Passive Clamping (ACPC)

The present invention relates generally to a DC/DC converter and specifically to a system and method to accelerate commutation for a passive clamp isolated boost for a high power bidirectional DC/DC converter. For the present application, high power could be defined as greater than 1 kW power.

Generally, the operation of inductive storing converters is based on energy transfer cycles. This includes a period of accumulation of magnetic energy in an inductive device (such as an inductor or transformer) through a circuit, followed by a period of restitution of this energy in a load (such as a typical 12V load in a car) through another circuit.

The present invention relates in particular to a DC/DC converter. This converter can be bidirectional and transform energy from primary to secondary circuits and from the secondary to primary circuits through a transformer. The primary circuit comprises at least one pair of switches such as switched diodes and the secondary circuit has two pairs of switches such as switched diodes that may be electrically coupled as a bridge, the switches in each pair being diagonally opposed from each other across the bridge. The converter of the present invention is particularly adapted to function like an electronic "starter/alternator" for an electric vehicle (EV) although several other types of applications are possible. The present invention can boost voltage up from a 12V battery to a high voltage to start up a fuel cell powered EV, and then can convert the voltage down from a high-voltage bus to a low-voltage bus to supply 12V loads and charge the battery. The present invention uses a special control method and system to accelerate transformer current transfer from one circuit to the other circuit during switching conditions.

In a bi-directional DC/DC converter, one side of the transformer can be current fed (for example, having high current to feed the battery). This is the primary side. The other side, the secondary side, can be voltage-fed. The energy can be transferred bi-directionally between the primary side and secondary side.

The present invention is an improvement over the prior art. Due to the existence of leakage inductance of an isolated transformer in a current-fed isolated DC/DC converter, the current passing through a choke, which is an inductor between a DC source and the primary circuit, generates a high voltage spike across the switching devices. This high voltage spike can damage the circuit during switching conditions. Specifically, the primary side normally experiences a high voltage overshoot during a switch-pair turn-off condition. This overshoot is simply the multiplication of the inductance and the rate of the current. To protect the circuitry, this voltage spike needs to be clamped (or dampened) to avoid the need to use high voltage rated switches in the circuits. A high voltage rating requirement makes the circuitry much more expensive since the circuitry must be able to withstand the relatively larger voltage spikes.

The control method and system of the present invention can reduce the clamping energy to the clamp circuit, thus reducing the voltage spike. This allows the use of less expensive low voltage rated switching circuitry.

Clamping can usually be characterized as passive clamping or active clamping. Usually, a normal passive clamping circuit, having a diode, a capacitor and a resistor, results in very low efficiency. In an alternative active-clamp current-fed isolated DC/DC converter, the root-mean-square (RMS) current going through the clamping switch is very high. Active clamping requires more parallel devices for the active clamp switch and very good capacitors for the active capacitor to handle such a high RMS current, adding significantly to the cost of the circuitry.

Therefore, to obtain cost effective clamping circuitry of the bi-directional DC/DC converter, the present invention has an accelerated commutation using passive clamping (ACPC). The present invention may provide better efficiency than the normal passive clamping circuit at lower cost than a typical active clamping circuit. Although the preferred embodiment of the present invention is targeted for vehicles propelled by electric traction motors, it could be used for any type of DC/DC conversion such as unidirectional or bi-directional conversion. By way of example, possible applications can include bi-directional charging between fuel cell and battery or bidirectional charging between a low voltage battery and a high voltage battery.

The present invention is best understood using the variables as defined below:

| Symbol: | Definition: |
| --- | --- |
| C | Capacitor |
| V | Voltage |
| R | Resistance |
| ACPC | accelerated commutation for passive clamping |
| $V_b$ | low voltage source side |
| $V_o$ | high voltage source side |
| $V_o$ to $V_b$ | buck-mode |
| $V_b$ to $V_o$ | boost-mode |
| L | choke or inductor arranged on the $V_b$ side |
| S1, S2, S3, S4 | switches that act as an inverter bridge ($V_b$ to $V_o$ in boost-mode) and a rectifier bridge ($V_o$ to $V_b$ in buck-mode) |
| S5, S6, S7, S8 | switches that act as a rectifier bridge in boost-mode ($V_b$ to $V_o$) and an inverter bridge in buck-mode ($V_o$ to $V_b$) |
| Dc-Cc-Rc | passive snubber designed for boost-mode |
| $I_L$ | inductor current |
| $L_{lk}$ | transformer leakage inductance |
| $I_p$ | Transformer primary current |
| Cc | snubber clamping capacitor |
| $I_s$ | transformer secondary current |

-continued

| Symbol: | Definition: |
| --- | --- |
| $R_c$ | snubber resistor |
| $D_c$ | clamping diode |
| $C_i$ | input filter capacitor |
| N | negative node |
| P | positive node |
| A | node A |
| B | node B |
| C | node C |
| D | node D |
| T | main transformer |
| $n_T$ | number of turns |
| $C_o$ | output filter capacitor |
| $T_s$ | high frequency switching period |

The method and system of the present invention can accelerate the circuit by shorting the secondary side of the transformer and routing switch voltage spikes to a dissipation circuit on the primary side such as a snubber circuit or small "buck" converter. Generally, the method and system turns on two switches on the secondary circuit (see switches S6 36 and S7 38 in FIG. 1) simultaneously for a minimal calibratable period (for example, 2 micro-seconds) when the pair of primary switches turn off, for example a pair of switches diagonally opposed across a bridge where the primary circuit is configured as a bridge. Thus, at least one pair of primary circuit switches are bypassed during switching conditions. This switching condition transfers primary current to secondary current very quickly since the whole voltage just applies to the leakage inductance of the transformer. Further, the voltage spike due to primary current and transformer leakage interaction can be largely reduced.

To illustrate the preferred embodiment of the invention, FIG. 1 shows a bidirectional full-bridge DC/DC converter with accelerated commutation for passive clamping (ACPC). As shown in FIG. 1, full-bridge in the primary side has Switches S1 26, S2 28, S3 30, and S4 32. The switches in the overall circuit can be semiconductors and may also have anti-paralleled diodes that are well known in the prior art. In the secondary side, the full-bridge has switches S5 34, S6 36, S7 38, and S8 40. A $V_b$ 20 represents a low voltage current source such as a battery, while a $V_o$ 22 represents a high voltage current source such as a generator. It should be noted that in all the circuit figures for the present invention the arrows represent the flow of current based on the status of the switches or controllers for that time interval. The dashed lines (124) in each figure represent that the branch enclosed within the dashed lines is switched off during that interval and does not carry any current.

Figure 11:
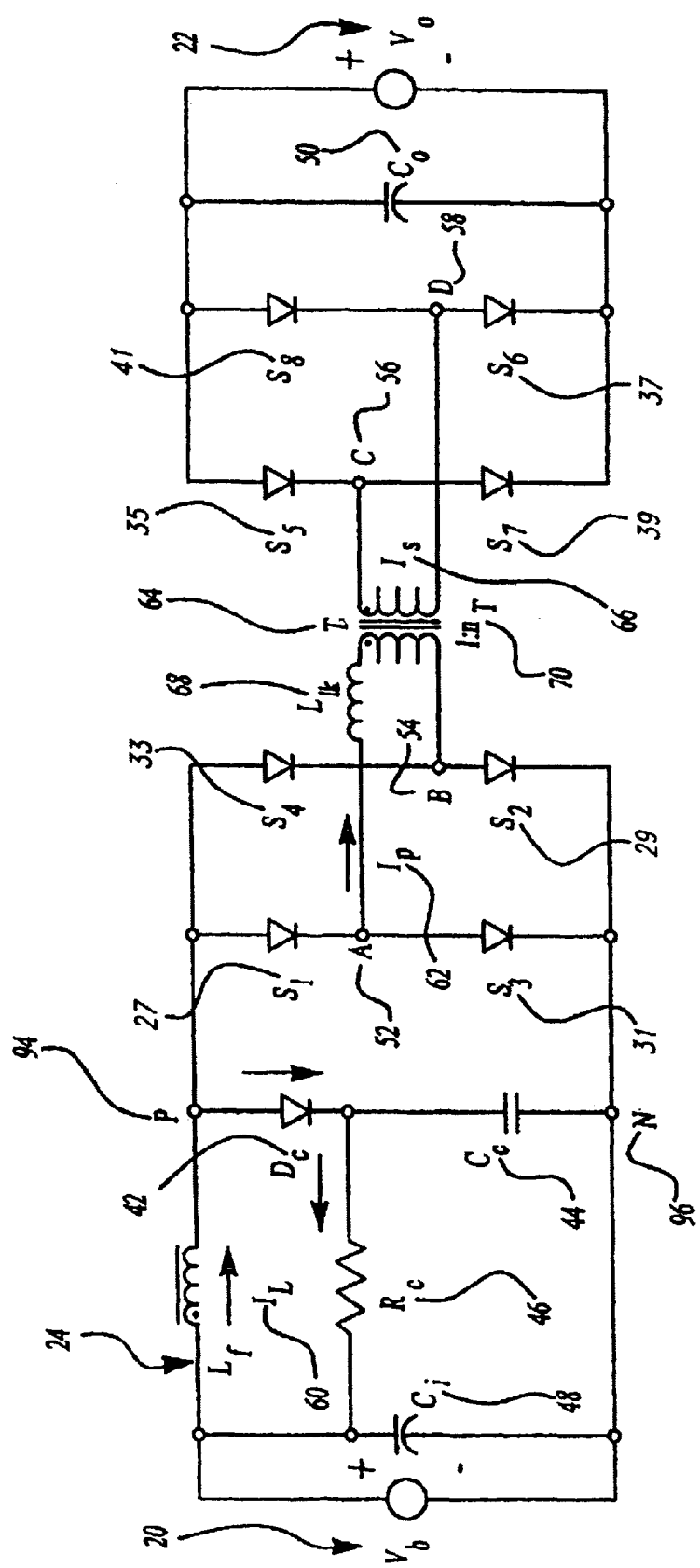
FIG. 11 illustrates a bi-directional full-bridge DC/DC converter with accelerated commutation for passive clamping (ACPC), according to another embodiment of the invention.

The present invention not only provides bi-directional DC/DC power flow control between the $V_b$ 20 and $V_o$ 22, but also isolates the $V_b$ 20 and $V_o$ 22 sources by a transformer (T) 64. A choke ($L_f$) 24 is positioned on the low voltage side ($V_b$ 20 side). When dower is delivered from $V_b$ 20 to $V_o$ 22, it is called "boost-mode." Switches S1 26, S2 28, S'30, and S4 32 act as an inverter bridge, and switches S5 34, S6 36, S7 38, and S8 40 act as a rectifier bridge. The inverter bridge inverts a DC/DC voltage to an AC voltage, and the rectified acts in reverse. Although switches are illustrated for the preferred embodiment, switched diode∝or other types of controllers known in the prior art could also be used. For example, FIG. 11 shows another embodiment of a bi-directional full-bridge DC/DC converter with accelerated commutation for passive clamping (ACPC). As shown in FIG. 11, switches S1 27, S2 29, S3 31, S4 33, S5 35, S6 37, S7 39 and S8 41 are configured as switching diodes. Referring back to FIG. 1, power delivered from $V_o$ 22 to $V_b$ 20 is called "buck-mode." In "buck-mode," switch S5 34, S6 36, S7 38, and S5 40 act as the inverter bridge, and switches S1 26, S2 28, S3 30, and S4 32 act as the rectifier bridge. The primary circuit also has a clamping diode (Dc) 42, a clamping capacitor (Cc) 44, and an energy dissipater such as a resistor (Rc) 46. The clamping diode Dc 42, clamping capacitor $C_c$ 44 and clamping resistor Rc 46 are electrically coupled to form a passive snubber (also known as a dampener) and designed to be most effective in the boost-mode. The effect of the snubber can be referred to as "snubbing." When the voltage spike occurs during the inverter bridge transition, the passive snubber circuit absorbs the energy and clamps the voltage to a lower value.

Additionally, the primary circuit has an input Capacitor ($C_i$) 48, an output capacitor ($C_o$) 50, a Node A (A) 52, a Node B (B) 54, a Node C (C) 56, a Node D (D) 58, a choke current through inductor ($I_L$) 60, primary current ($I_P$) 62. A transformer (T) 64 is coupled between the primary and secondary circuits, Transformer Secondary Current ($I_s$) 66, Transformer Leakage Inductance ($L_{lK}$) 68, and the Ratio of Transformer Wire Turns 1:$n_t$ 70 are all characteristics and parameters associated with the transformer 64.

Figure 2:
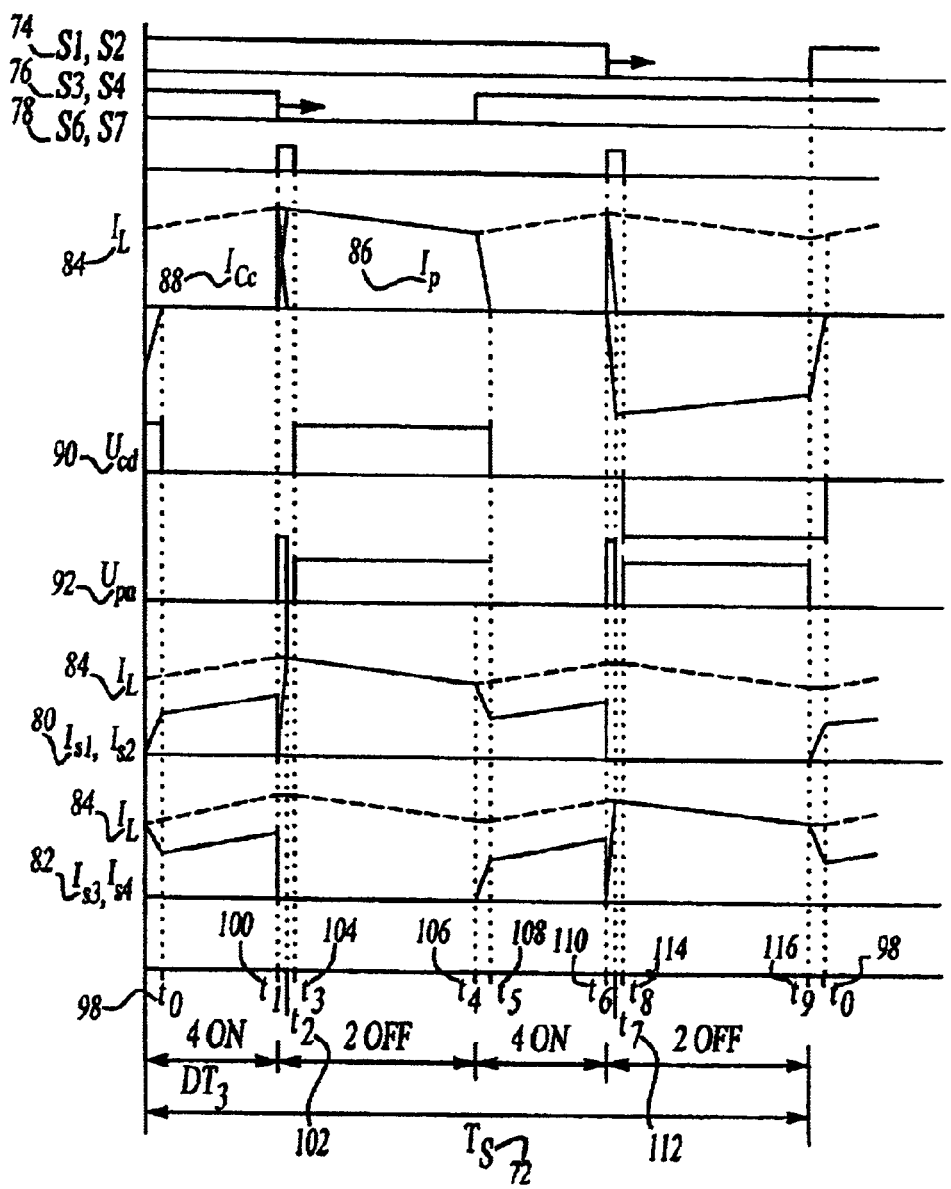
FIG. 2 illustrates a Timing diagram of the proposed converter.

FIG. 2 illustrates the timing waveform diagram for the circuit illustrated in FIG. 1 during time interval $T_s$ 72. As shown in FIG. 2, the status of various switches during the $T_s$ 72 is represented by "S1, S2" 74, "S3, S4" 76, and "S6, S7" 78. When the switch is "ON," a line is drawn above a base line, the switch providing a short circuit path for bypassing an associated diode. "$I_{S1}$, $I_{S2}$" 80 represents the current during the $T_s$ 72 for switches S1 26 and S2 28 respectively. "$I_{S3}$, $I_{S4}$" 82 represents the current during the $T_s$ 72 for switches S3 30 and S4 32 respectively. $I_L$ 84 represents the current through the inductor $L_f$ for the corresponding interval. $I_P$ 86 represents the current through the primary side of the T 64, and $U_{Cc}$ 88 represents the current through the snubber circuit (Dc 42-Cc 44-Rc 46). $U_{pn}$ 92 represents the voltage between a Positive Node (P) 94 and a Negative Node (N) 96, respectively. The timing waveform diagram of FIG. 2 is best understood by dividing time interval $T_s$ 72 into subintervals $t_0$ 98, $t_1$ 100, $t_2$ 102, $t_3$ 104, $t_4$ 106, $t_5$ 108, $t_6$ 110, $t_7$ 112, $t_8$ 114, and $t_9$ 116.

Figure 3:
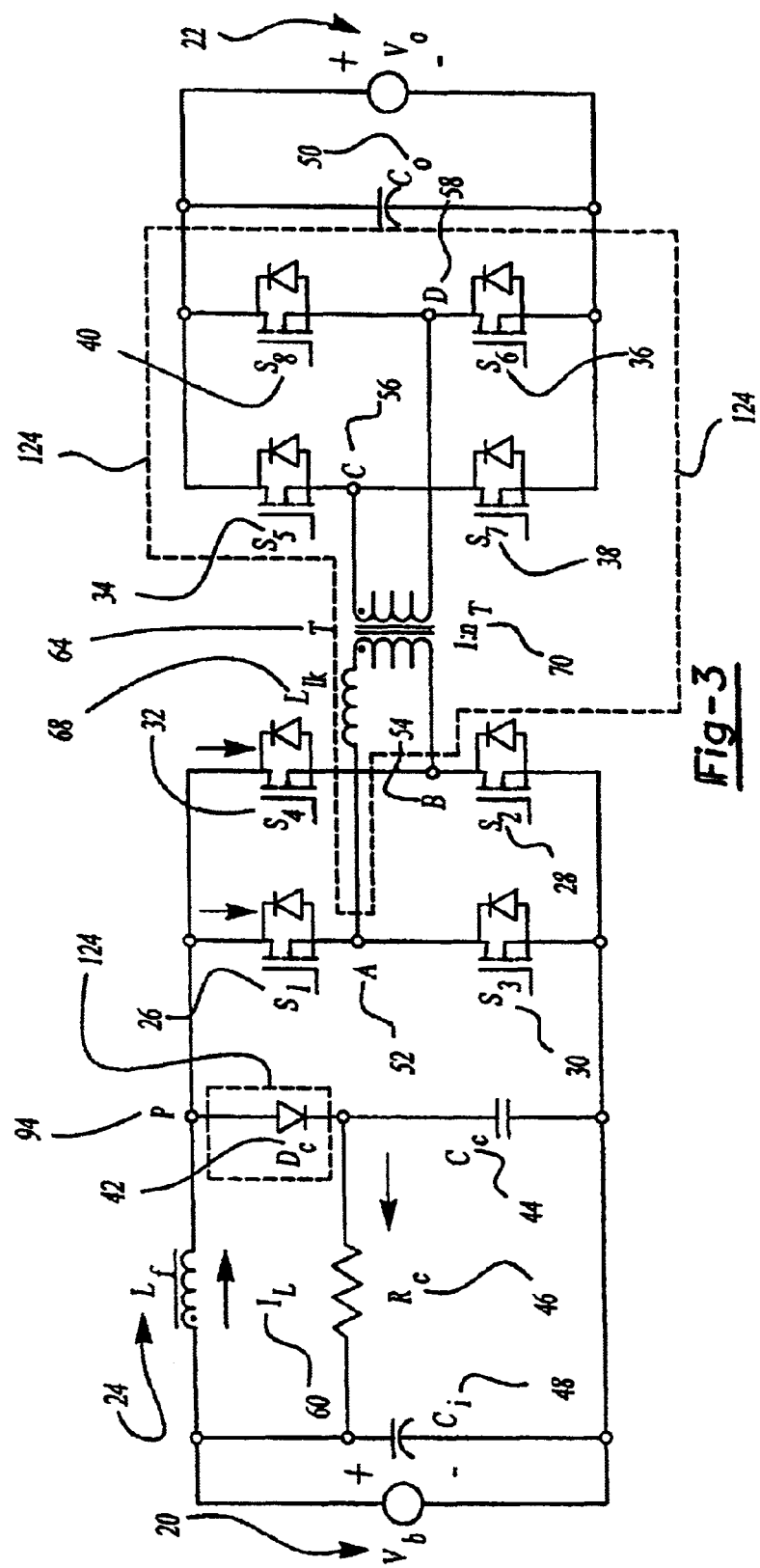
FIG. 3 illustrates a $[t0, t_1]$ Interval.

During a first interval [$t_0$ 98, $t_1$ 100] illustrated in FIG. 3, switches S1 26, S2 28, S3 30, and S4 32, are turned ON. Switches S5 34, S6 36, S6 38, and S8 40, are turned OFF. $L_f$ 24 is charged by low voltage voltage source $V_b$ 20 and the $I_L$ 60 increases linearly.

Figure 4:
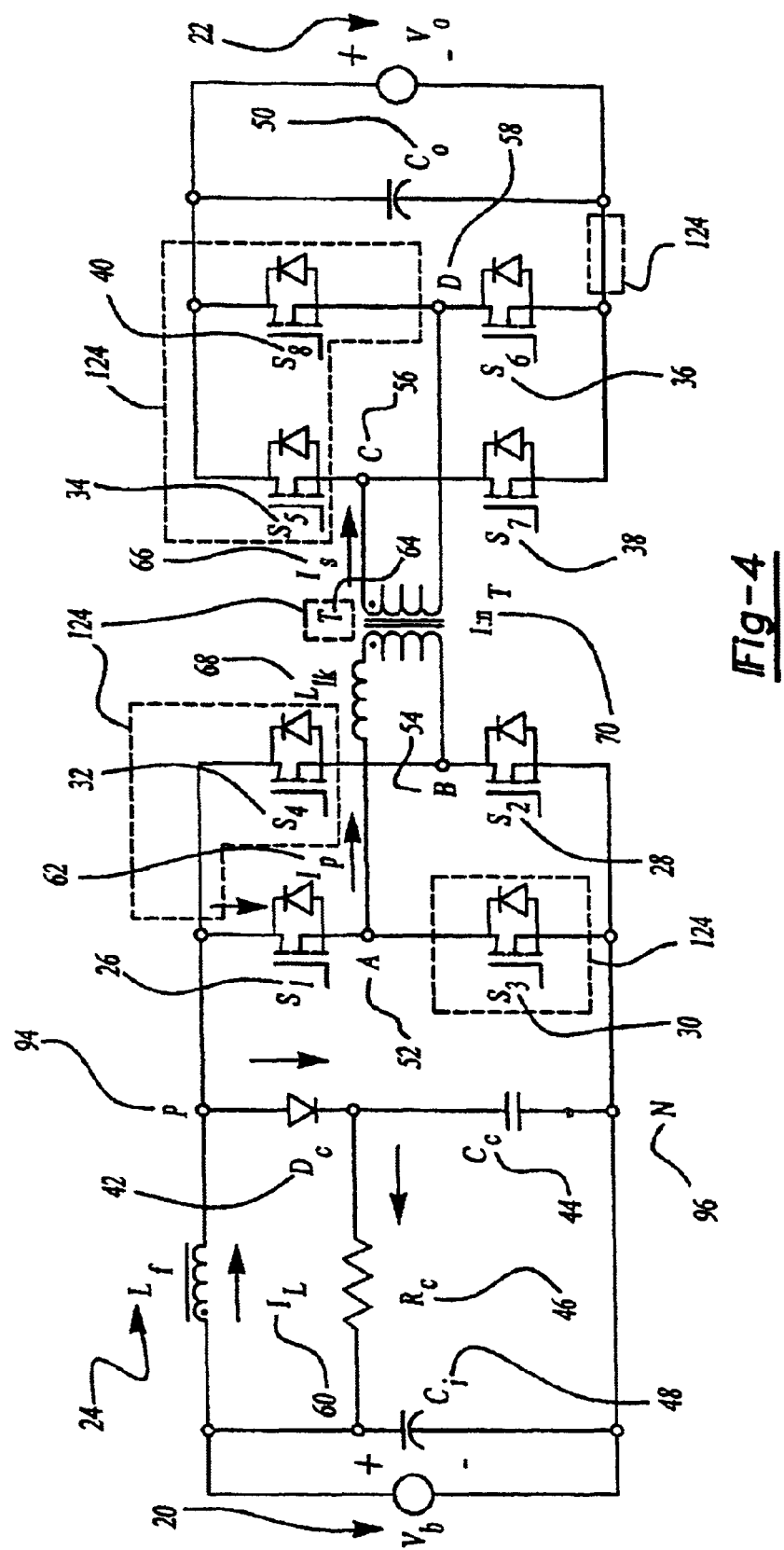
FIG. 4 illustrates a $[t_1, t_2]$ Interval.

During a second interval [$t_1$ 100, $t_2$ 102] illustrated in FIG. 4, two switches in the primary circuit are turned OFF, for example, switches S3 30 and S4 32 which are diagonally opposed from one another across the bridge circuit formed by switches S1 26, S2 28, S3 30 and S4 32. It is during this switching condition time interval that the voltage spike is normally experienced. Also during the second interval [$t_1$ 100, $t_2$ 102], a pair of switches S6 36 and S6 38 in the secondary circuit are turned on, shorting the secondary side of the transformer T 64. Due to the existence of the transformer leakage inductance $L_{1k}$ 68, the transformer primary current $I_P$ 62 cannot instantly change to the inductor current $I_L$ 60. Therefore, transformer primary current $I_P$ 62 increases linearly to the inductor current $I_L$ 60 while the current $I_{cc}$ 88 through the snubber circuit (Dc 42-Cc 44-Rc 46) linearly decreases to zero.

During the second interval [$t_1$ 100, $t_2$ 102], the difference between the inductor current $I_L$ 60 and the transformer primary current $I_L$ 62 is stored in the clamping capacitor $C_c$ 44, avoiding the high voltage spike across the positive node 94 and negative node 96 of the bus. Using the design of the present invention, the snubber circuit Dc 42-Cc 44-Rc 46 protects switches S1 26, S2 28, S3 30, and S4 32 during this second interval. It does this by not only turning OFF switches on the primary side, but also by providing a means for a smooth transition between $I_L$ 60 to $I_P$ 62 via the snubber circuit (switching condition). The switches are turned OFF for the minimal calibratable time in this embodiment which may be, by way of example, approximately 2 microseconds.

Figure 5:
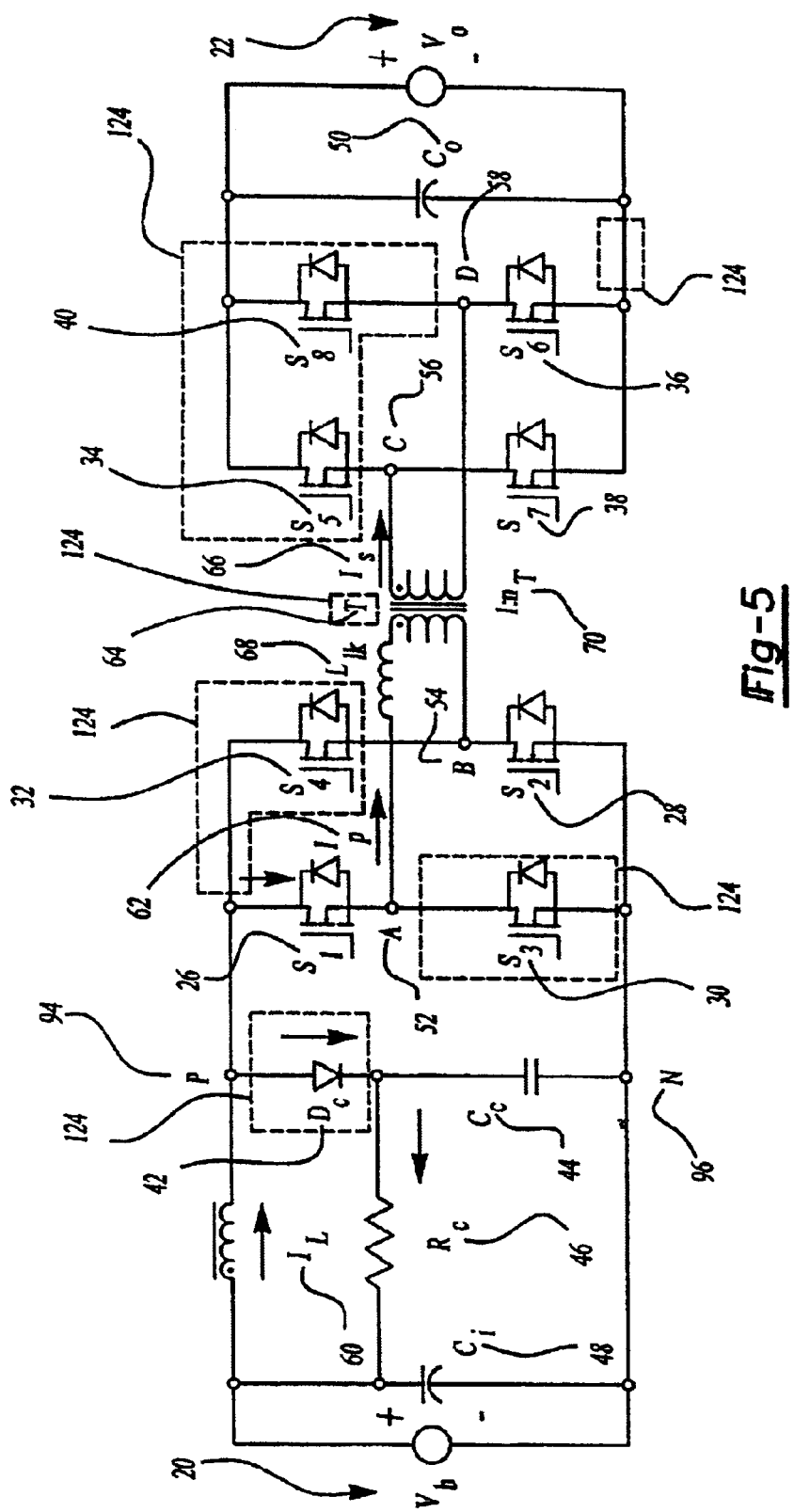
FIG. 5 illustrates a $[t_2, t_3]$ Interval.

Next, at a third time interval [$t_2$ 102, $t_3$ 104] illustrated in FIG. 5, switches S6 36 and S6 38 remain "ON," thus the secondary side of the transformer T 64 remains shorted. During this interval, the transformer primary current $I_P$ 62 approximately equals the inductance current $I_L$ 60 and the voltage $U_{PN}$ 92 is inverted.

Figure 6:
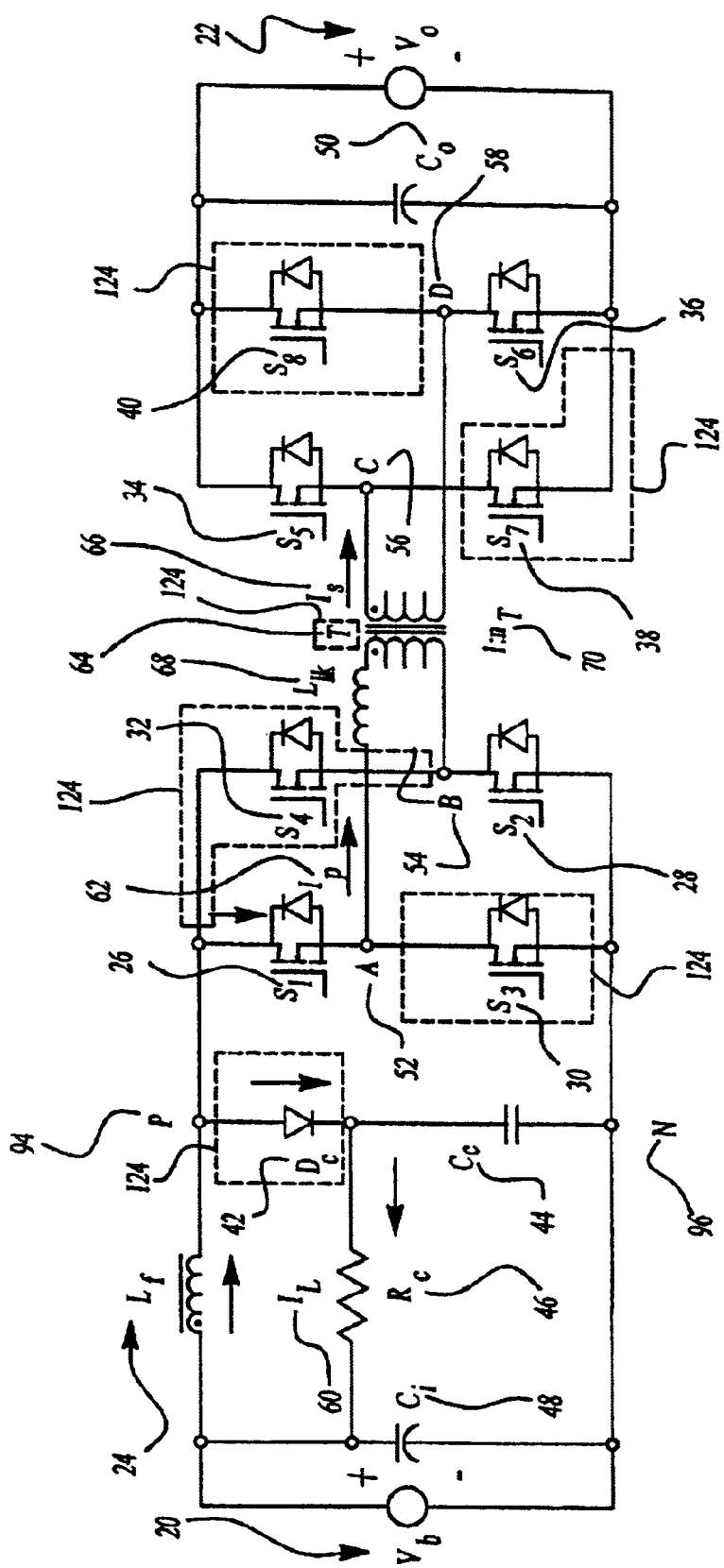
FIG. 6 illustrates a $[t_3, t_4]$ Interval.

A fourth time interval 8 $t_3$ 104, $t_4$ 106 illustrated in FIG. 6 is an energy transferring interval. Here, switches S7 38 and S8 40 are turned off at time $t_3$ 104. Then the transformer secondary current $I_s$ 66 goes through body diode switches S5 34 and S6 36, delivering energy from the primary side to the secondary side, (i.e., "boost-mode").

Figure 7:
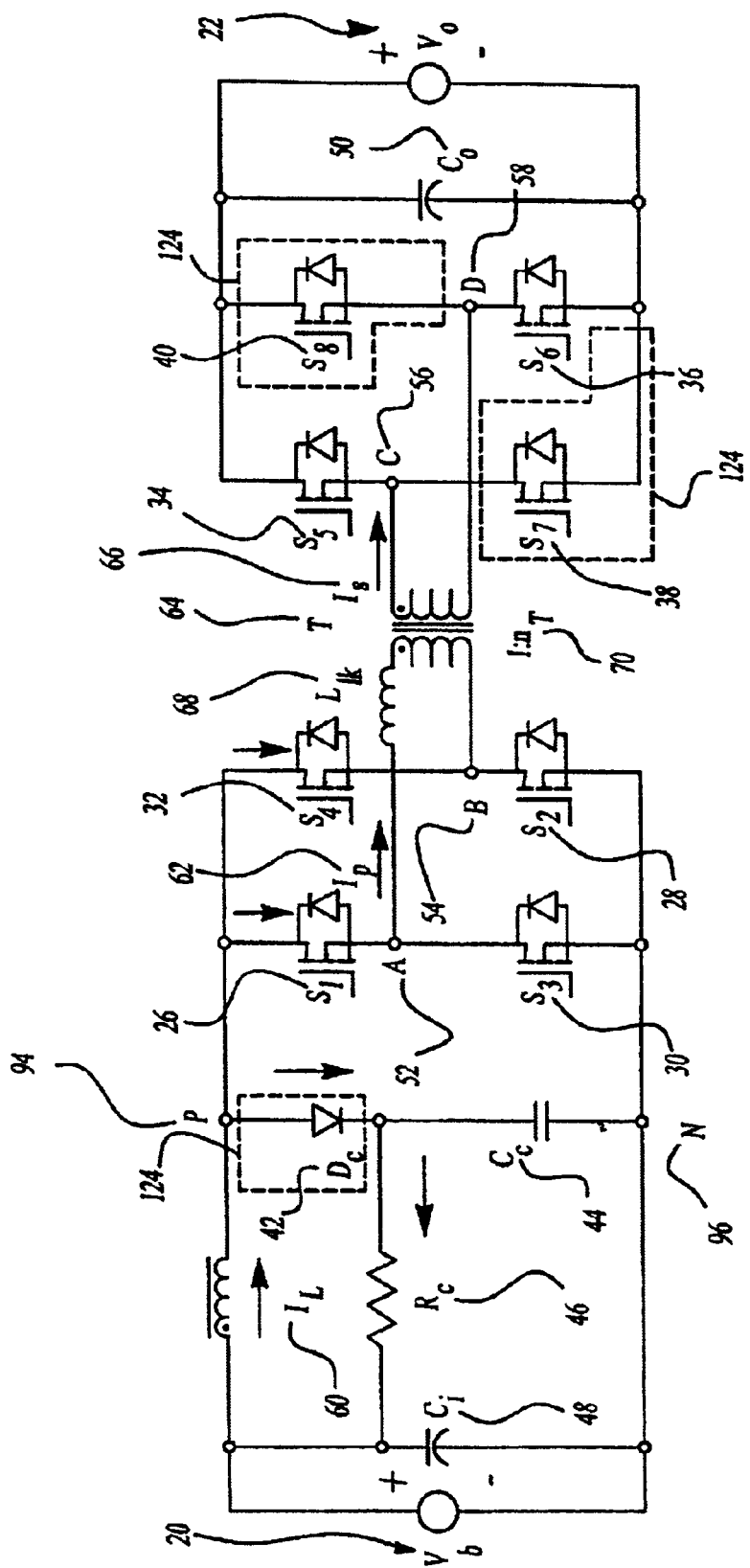
FIG. 7 illustrates a $[t_4, t_5]$ Interval.

At time $t_4$ 106, during a fifth time interval [$t_4$ 106, $I_5$ 108] illustrated in FIG. 7, switches S3 30 and S4 32 are switched "ON." The circuit of the primary side of the transformer T 64 is shorted again to store energy to the inductor $L_f$ 24. Consequently, the inductor current $I_L$ increases linearly. Due to the reflected voltage $V_o$ 22 applies on the transformer leakage inductance $L_{1k}$ 68, the transformer primary current $I_P$ 62 is reset to zero.

Figure 8:
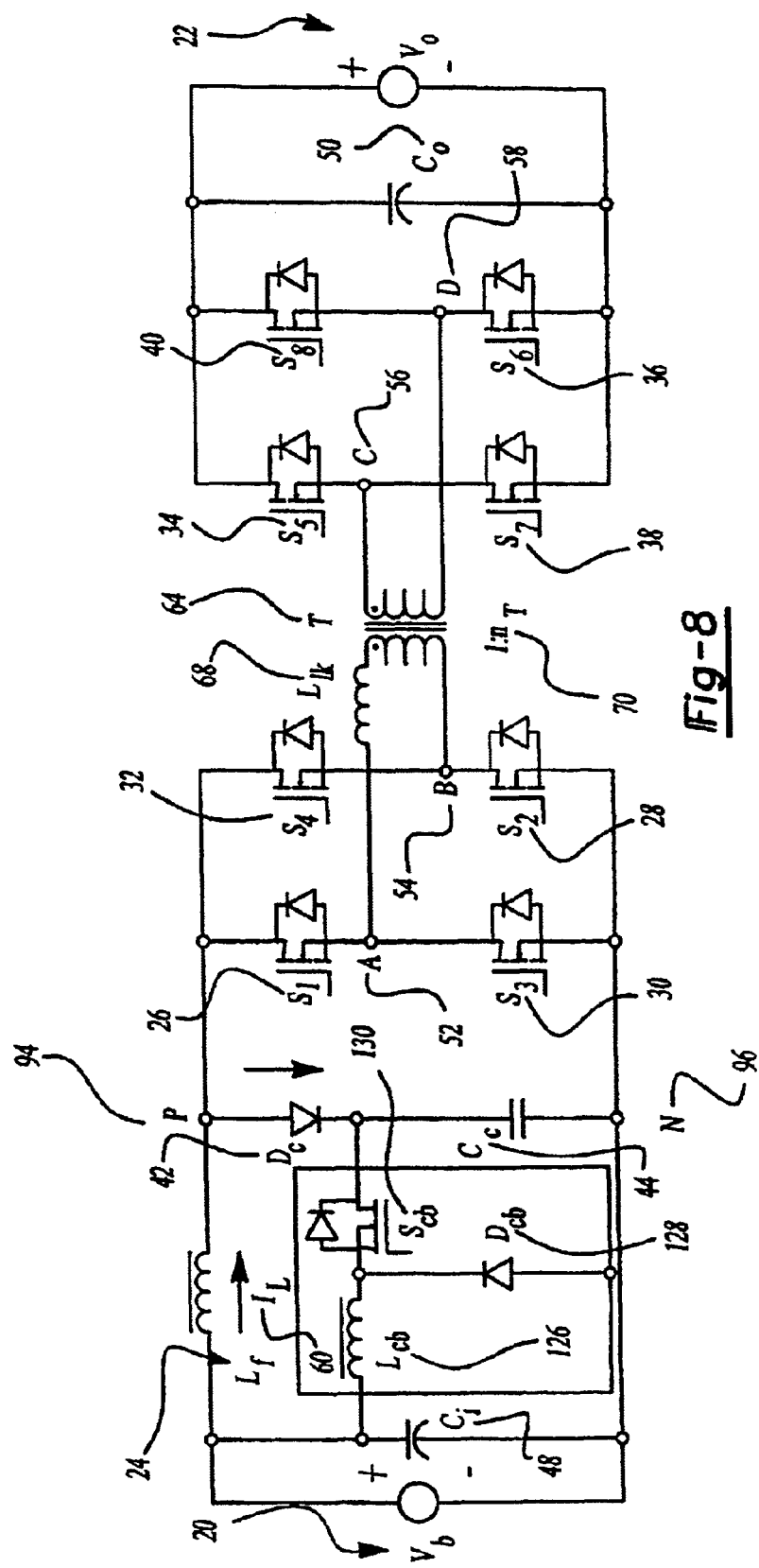
FIG. 8 illustrates an alternative embodiment using a small buck converter instead of a clamping resistor (Rc)

As shown in FIG. 1, some energy stored in clamping capacitor $C_c$ 44 is dissipated via the clamping resistor $R_c$ 46. This causes some loss of energy and thus can lower overall circuit efficiency. As an alternate embodiment of the present invention, FIG. 8 illustrates a small "buck" converter 118 replacing the clamping resistor $R_c$ 46 to recycle the power in the snubber circuit back to the low voltage voltage source, where efficiency is a concern. The small "buck" converter" includes an inductor filter Lcb 126, an active switch Scb 128, and a rectifier diode Dcb 130.

Figure 9:
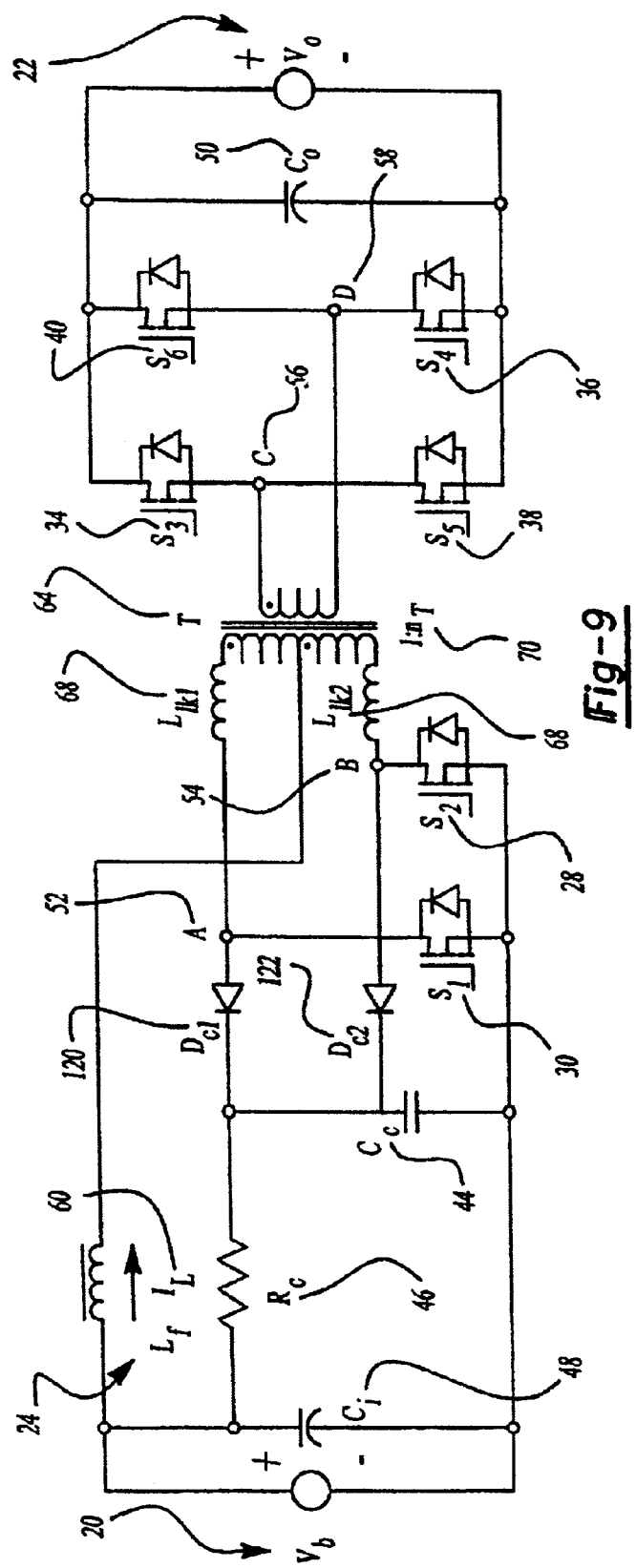
FIG. 9 illustrates a Push-pull Converter with Accelerated Commutation for Passive Clamping (ACPC)
Figure 10:
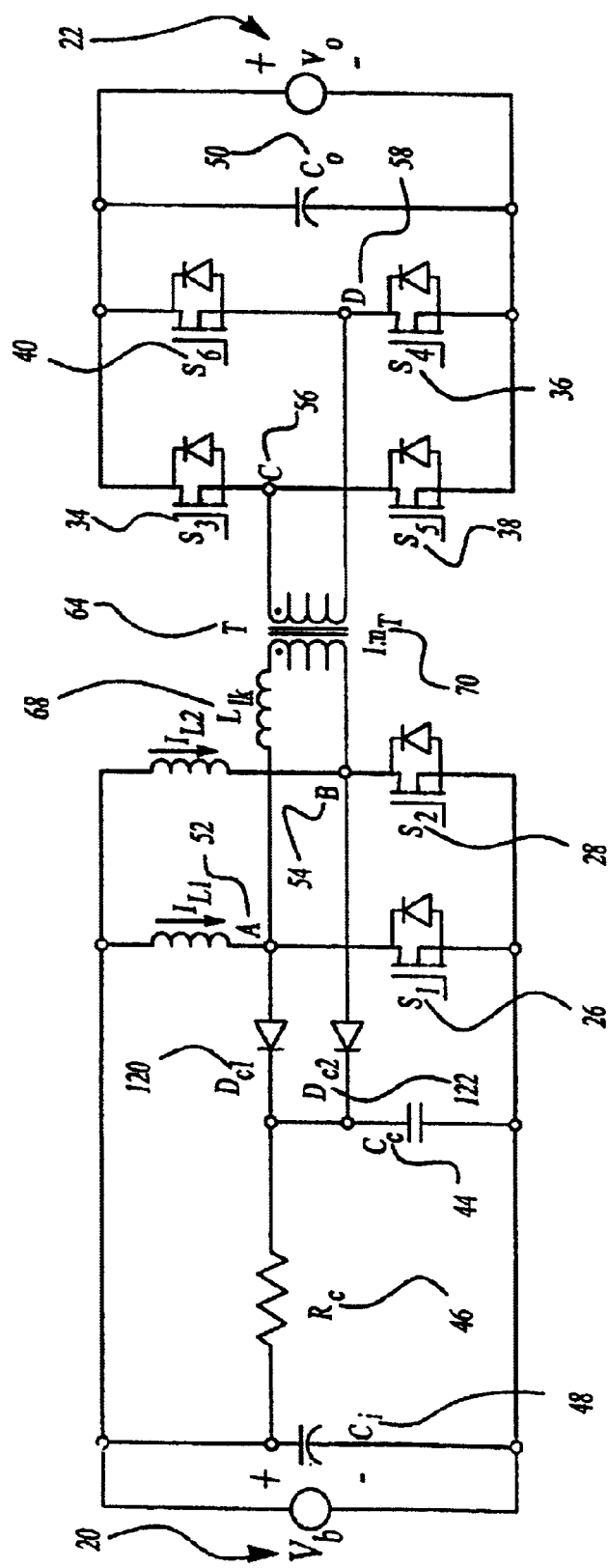
FIG. 10 illustrates an L-type Converter with Accelerated Commutation for Passive Clamping (ACPC).

Other alternate embodiments using different types of converters are also possible. FIG. 9 illustrates a variation using a "push-pull" converter with Accelerated Commutation for Passive Clamping (ACPC). Here the bridge configuration of the switched diodes S1–S4 is replaced with a "push-pull" configuration employing one pair of the switching diodes S1, S2. FIG. 10 illustrates yet another embodiment using an L-type Converter with Accelerated Commutation for Passive Clamping (ACPC). Here, the bridge configuration of the switched diodes S1–S4 is replaced with a "L-type" configuration employing one pair of the switched diodes S1, S2. The push-pull and L-type configurations, which have a different number of inductors and switches in the primary side, offer a greater variety of choices for different power and voltage applications.

The above-described embodiments of the invention are provided purely for purposes of example. Many other variations, modifications, and applications of the invention may be made.

We claim:

1. A method of commutation in an electrical circuit, comprising:

applying a voltage to a primary side of a transformer by way of a primary side bridge circuit;

shorting a secondary side of the transformer by way of a secondary side bridge circuit when each controller of a pair of controllers in the primary side bridge circuit change a state; and dissipating a high voltage spike via a snubbing circuit electrically coupled across the primary side bridge circuit.

2. A method of commutation in an electrical circuit, comprising:

applying a voltage to a primary side of a transformer by way of a primary side bridge circuit; and shorting a secondary side of the transformer by way of a secondary side bridge circuit when each controller of a pair of controllers in the primary side bridge circuit change a state wherein shorting the secondary side of the transformer by way of the secondary side bridge circuit includes bypassing a first diode in a first leg of the secondary side bridge circuit and bypassing a second diode in a second leg of the secondary side bridge circuit.

3. The method of claim 2 wherein bypassing the first diode in the first leg of the secondary side bridge circuit and bypassing the second diode in the second leg of the secondary side bridge circuit includes closing a first switch electrically coupled in parallel with the first diode in the first leg of the secondary side bridge circuit and closing a second switch electrically coupled in parallel with the second diode in the second leg of the secondary side bridge circuit, where a first terminal of the first diode has a first polarity and is connected to a first terminal of the second diode, the first terminal of the second diode having a first polarity that is the same as the polarity of the first terminal of the first diode.

4. The method of claim 2 wherein bypassing the first diode in the first leg of the secondary side bridge circuit and bypassing the second diode in the second leg of the secondary side bridge circuit includes turning ON a first transistor electrically coupled in parallel with the first diode in the secondary side bridge circuit and turning ON a second transistor electrically coupled in parallel with the second diode in the secondary side bridge circuit, where a first terminal of the first diode has a first polarity and is connected to a first terminal of the second diode, the first terminal of the second diode having a first polarity that is the same as the polarity of the first terminal of the first diode.

5. The method of claim 2 wherein shorting the secondary side of the transformer by way of the secondary side bridge circuit when each controller of the pair of controllers in the primary side bridge circuit change a state further includes removing a short circuit path across each of a respective pair of diodes forming at least a portion of the primary side bridge circuit.

6. The method of claim 2 wherein the secondary side of the transformer is shorted for a determined period.

7. The method of claim 2 wherein the secondary side of the transformer is shorted for a determined period of approximately two micro-seconds.

8. The method of claim 2 wherein the secondary side of the transformer is shorted for a determined period of approximately two micro-seconds, and further comprising:

turning OFF a first transistor electrically coupled in parallel with the first diode of the secondary side bridge circuit and turning OFF a second transistor electrically coupled in parallel with the second diode of the secondary side bridge circuit after the determined period, where a first terminal of the first diode has a first polarity and is connected to a first terminal of the second diode, the first terminal of the second diode having a first polarity that is the same as the polarity of the first terminal of the first diode.

9. The method of claim 2, further comprising:
dissipating a high voltage spike via a small buck converter electrically coupled between the primary side bridge circuit and the voltage applied to the primary side of the transformer.

10. A method of commutation in a DC/DC converter including a transformer, an inverter circuit coupled to a first side of the transformer, the inverter circuit having at least one pair of diodes, and a rectifier circuit coupled to a second side of the transformer, the rectifier circuit having a first leg including a first diode and a second leg having a second diode, the first diode of the first leg having a first pole connected to a first pole of the second diode of the second leg, the first poles of the first and the second diodes having a same polarity, the method comprising:
bypassing the first diode in the first leg of the rectifier circuit when the pair of diodes of the inverter circuit stop being bypassed; and
bypassing the second diode in the second leg of the rectifier circuit when the pair of diodes of the inverter circuit stop being bypassed.

11. The method of claim 10, further comprising:
bypassing each of a first and a second diodes in the pair of diodes in the inverter circuit to cause the pair of diodes in the inverter circuit to stop conducting.

12. The method of claim 10 wherein bypassing the first diode and bypassing the second diodes includes closing a respective switch coupled across each of the first and the second diodes.

13. The method of claim 10 wherein the first and the second diodes of the rectifier circuit are switching diodes and bypassing the first diode and bypassing the second diodes includes applying a control signal to a respective control terminal of each of the first and the second diodes of the rectifier circuit.

14. The method of claim 10 wherein the first and the second diodes of the rectifier circuit are bypassed for a determined period.

15. The method of claim 10 wherein the first and the second diodes of the rectifier circuit are bypassed for a determined period of approximately two micro-seconds.

16. The method of claim 10 wherein the first and the second diodes of the rectifier circuit are bypassed simultaneously during a period.

17. The method of claim 10, further comprising:
dissipating a high voltage spike via a snubbing circuit electrically coupled across the inverter circuit.

18. The method of claim 10, further comprising:
dissipating a high voltage spike via a small buck converter electrically coupled between the inverter circuit and a primary side voltage source.

19. A method of commutation in an electrical circuit, comprising:
at a first time, providing a switching signal to a first controller of an inverter circuit electrically coupled to a first side of a transformer to remove a short circuit path across a first diode of the inverter circuit;
at approximately the first time, providing a switching signal to a second controller of the inverter circuit to remove a short circuit path across a second diode of the inverter circuit;
at approximately the first time, providing a switching signal to a first controller of a rectifier circuit electrically coupled to a second side of the transformer to provide a short circuit path across a first diode of the rectifier circuit; and
at approximately the first time, providing a switching signal to a second controller of the rectifier circuit to provide a short circuit path across a second diode of the rectifier circuit, where a first pole of the first diode of the rectifier circuit is connected to a first pole of the second diode of the rectifier circuit, the first poles of the first and the second diodes of the rectifier circuit having a same polarity.

20. The method of claim 19, further comprising:
at a second time, providing a further switching signal to the first controller of the rectifier circuit to remove the short circuit path across the first diode of the rectifier circuit, the second time following the first time by a first period; and
at approximately the second time, providing a further switching signal to the second controller of the rectifier circuit to remove the short circuit path across the second diode of the rectifier circuit.

21. The method of claim 19, further comprising:
at a second time approximately 2 micro-seconds after the first time, providing a further switching signal to the first controller of the rectifier circuit to remove the short circuit path across the first diode of the rectifier circuit; and
at approximately the second time, providing a further switching signal to the second controller of the rectifier circuit to remove the short circuit path across the second diode of the rectifier circuit.

22. The method of claim 19, further comprising:
at a second time, providing a further switching signal to the first controller of the rectifier circuit to remove the short circuit path across the first diode of the rectifier circuit, the second time following the first time by a first period;
at approximately the second time, providing a further switching signal to the second controller of the rectifier circuit to remove the short circuit path across the second diode of the rectifier circuit;
at a third time following the second time, providing a switching signal to a third controller of the inverter circuit to remove a short circuit path across a third diode of the inverter circuit;
at approximately the third time, providing a switching signal to a fourth controller of the inverter circuit to remove a short circuit path across a fourth diode of the inverter circuit, the first, second, third and fourth diodes of the inverter circuit electrically coupled in a bridge;
at approximately the third time, providing an even further switching signal to the first controller of the rectifier circuit to again provide the short circuit path across the first diode of the rectifier circuit; and
at approximately the third time, providing an even further switching signal to the second controller of the rectifier circuit to again provide the short circuit path across the second diode of the rectifier circuit.

23. The method of claim 19, further comprising:
dissipating a voltage spike via a circuit means.

24. The method of claim 19, further comprising:
dissipating a voltage spike via a snubber circuit.

25. The method of claim 19, further comprising:
dissipating a voltage spike via a small buck converter electrically coupled between the transformer and a voltage source.

26. A DC/DC converter, comprising:
a transformer having a primary side and a secondary side;
an inverter circuit electrically coupled to the primary side of the transformer, the inverter circuit comprising at least two diodes and means for selectively providing a short circuit condition across each of the two diodes; and
a circuit means for temporarily shorting the secondary side of the transformer each time the short circuit condition across the two diodes of the inverter circuit ceases.

27. The DC/DC converter of claim 26 wherein the means for selectively providing a short circuit condition across each of the two diodes includes a pair of transistors, each of the transistors coupled across a respective one of the diodes.

28. A converter comprising:
a transformer having a primary side and a secondary side;
an inverter circuit electrically coupled to the primary side of the transformer;
a rectifier circuit electrically coupled to the secondary side of the transformer wherein the secondary side of the transformer is shorted by way of the rectifier circuit when each controller of a pair of controllers in the inverter circuit change a state;
an inductor electrically coupled between a voltage source and the inverter circuit; and
a snubber circuit electrically coupled between the voltage source and the inverter circuit for dissipating a high voltage spike.

29. The converter of claim 28 wherein the pair of controllers in the inverter circuit change a state when each of the controllers is switched from a first state bypassing a respective one of a pair of diodes in the inverter circuit to a second state not bypassing the respective diode.

30. The converter of claim 28 wherein the rectifier circuit removes the short across the secondary side of the transformer a determined period after the pair of controllers in the inverter circuit change the state.

31. The converter of claim 28 wherein the rectifier circuit comprises four switching diodes in a bridge configuration.

32. The converter of claim 28 wherein the rectifier circuit comprises four diodes in a bridge configuration, and four switches, a respective one of the switches coupled across each of the diodes for selectively providing a short circuit across the respective diode.

33. The converter of claim 28 wherein the inverter circuit comprises four switching diodes in a bridge configuration.

34. The converter of claim 28 wherein the inverter circuit comprises four diodes in a bridge configuration, and four switches, a respective one of the switches coupled across each of the diodes for selectively providing a short circuit across the respective diode.

35. The converter of claim 28 wherein the inverter circuit comprises two diodes in a push-pull configuration, and two switches, a respective one of the switches coupled across each of the diodes for selectively providing a short circuit across the respective diode.

36. The converter of claim 28 wherein the inverter circuit comprises two diodes in an L-type configuration, and two switches, a respective one of the switches coupled across each of the diodes for selectively providing a short circuit across the respective diode.

37. The converter of claim 28 wherein the controllers are switched diodes.

38. The converter of claim 28, further comprising:
a capacitance electrically coupled in parallel across the voltage source and coupled between the voltage source and the inverter circuit.

39. The converter of claim 28, further comprising:
a capacitance electrically coupled in parallel across the voltage sources, and wherein the snubber circuit comprises a clamping diode, a clamping capacitor, a buck diode, a buck inductor and a buck switch, the clamping diode and clamping capacitor electrically coupled in series with one another and electrically coupled in parallel across the voltage source and the inductor, the buck inductor and the buck switch electrically coupled in series with one another between the capacitance and a node between the clamping diode and clamping capacitor, the buck diode electrically coupled between a first node between the buck inductor and the buck switch and a second node between a pole of the voltage source and the inverter circuit.

40. The converter of claim 28, further comprising:
a capacitance electrically coupled in parallel across the voltage source and coupled between the voltage source and the inverter circuits, and wherein the snubber circuit comprises a clamping diode, a clamping capacitor and a clamping resistor, the clamping diode and clamping capacitor electrically coupled in series with one another and electrically coupled in parallel across the voltage source and the inductor, the clamping resistor electrically coupled in parallel with the inductor.

41. The converter of claim 28, further comprising:
a small buck converter electrically coupled between the voltage source and the inverter circuit.

42. A DC/DC converter, comprising:
a transformer having a first side and a second side;
a first circuit electrically coupled to the first side of the transformer, the first circuit comprising at least one pair of diodes and a respective switch coupled across each of the diodes to selectively bypass the same;
a second circuit electrically coupled to the second side of the transformer, the second circuit comprising at least a first pair of diodes and a respective switch coupled across each of the diodes in the first pair of diodes to selectively bypass the same, the diodes of the first pair each having a first terminal of a first polarity, the first terminal of the first diode connected to the first terminal of the second diode; and
a control circuit operatively coupled to control the switches of the first and the second circuits, the control circuit configured to temporarily bypass the pair of diodes of the second circuit when the switches across the pair of diodes in the second circuit stop providing a bypass.

43. The DC/DC converter of claim 42, further comprising:
a voltage spike dissipation circuit electrically coupled between a first side voltage source and the first circuit, the voltage spike dissipation circuit comprising a small buck converter.

44. The DC/DC converter of claim 42 wherein the switches are transistors.

45. The DC/DC converter of claim 42 wherein the switches are field effect transistors.

46. The DC/DC converter of claim 42 wherein the second circuit includes a second pair of diodes and a respective switch coupled across each of the diodes in the second pair of diodes to selectively bypass the same, the diodes of the second circuit electrically coupled as a bridge.

47. The DC/DC converter of claim 42 wherein the first circuit includes a second pair of diodes and a respective switch coupled across each of the diodes in the second pair of diodes to selectively bypass the same, the diodes of the first circuit electrically coupled as a bridge.

48. The DC/DC converter of claim 42 wherein the pair of diodes of the first circuit are electrically coupled in a push-pull configuration.

49. The DC/DC converter of claim 42 wherein the pair of diodes of the first circuit are electrically coupled in an L-type configuration.

50. The DC/DC converter of claim 42, further comprising:
a choke electrically coupled between a first side voltage source and the first circuit.

51. The DC/DC converter of claim 42, further comprising:
a dissipation circuit electrically coupled between a first side voltage source and the first circuit.

52. The DC/DC converter of claim 42, further comprising:
a choke electrically coupled between a first side voltage source and the first circuit; and
a voltage spike dissipation circuit electrically coupled between the first side voltage source and the first circuit, the voltage spike dissipation circuit comprising a clamping diode, a clamping capacitor and a clamping resistor, the clamping diode and the clamping capacitor electrically coupled in series with one another and electrically coupled in parallel across the first side voltage source and the choke, the clamping resistor electrically coupled in parallel with the choke.

53. A control logic for controlling the operation of a plurality of switching devices in a first circuit electrically coupled to a first side of a transformer and a second circuit electrically coupled to a second side of the transformer, the control logic controlling the operation by:
at a first time, providing a switching signal to a first controller of the first circuit to remove a short circuit path across a first diode of the first circuit;
at approximately the first time, providing a switching signal to a second controller of the first circuit to remove a short circuit path across a second diode of the first circuit;
at approximately the first time, providing a switching signal to a first controller of the second circuit to provide a short circuit path across a first diode of the second circuit; and
at approximately the first time, providing a switching signal to a second controller of the second circuit to provide a short circuit path across a second diode of the second circuit, where a first pole of the first diode of the second circuit is connected to a first pole of the second diode of the second circuit, the first poles of the first and the second diodes of the second circuit having a same polarity.

54. The control logic of claim 53 for controlling the operation of a plurality of switching devices further by:
at a second time approximately 2 micro-seconds after the first time, providing a further switching signal to the first controller of the second circuit to remove the short circuit path across the first diode of the second circuit; and
at approximately the second time, providing a further switching signal to the second controller of the second circuit to remove the short circuit path across the second diode of the second circuit.

55. The control logic of claim 53 for controlling the operation of a plurality of switching devices, further by:
at a second time following the first time, providing a further switching signal to the first controller of the second circuit to remove the short circuit path across the first diode of the second circuit;
at approximately the second time, providing a further switching signal to the second controller of the second circuit to remove the short circuit path across the second diode of the second circuit;
at a third time following the second time, providing a switching signal to a third controller of the first circuit to remove a short circuit path across a third diode of the first circuit;
at approximately the third time, providing a switching signal to a fourth controller of the first circuit to remove a short circuit path across a fourth diode of the first circuit, the first, second, third and fourth diodes of the first circuit electrically coupled in a bridge;
at approximately the third time, providing an even further switching signal to the first controller of the second circuit to again provide the short circuit path across the first diode of the second circuit; and
at approximately the third time, providing an even further switching signal to the second controller of the second circuit to again provide the short circuit path across the second diode of the second circuit.

56. A method of commutation in an electrical circuit having a transformer, an inductor electrically coupled to a first side of the transformer, an inverter circuit electrically coupled to the first side of the transformer and a rectifier circuit electrically coupled to a second side of the transformer, the method comprising:
at a first energy storage time, charging the inductor;
at a first voltage spike suppression time, following the first energy storage time, shorting the second side of the transformer;
at approximately the first voltage spike suppression time, providing a DC voltage to the first side of the transformer having a first polarity; and
at a first energy transfer time, following the first voltage spike suppression time, removing the short from the second side of the transformer.

57. The method of claim 56, further comprising:
at a second energy storage time, following the first energy transfer time, charging the inductor;
at a second voltage spike suppression time, following the second energy storage time, shorting the second side of the transformer; and
at approximately the second voltage spike suppression time, providing a DC voltage to the first side of the transformer having a second polarity, opposite the first polarity; and
at a second energy transfer time, following the second voltage spike suppression time, removing the short from the second side of the transformer.

58. The method of claim 56 wherein charging the inductor includes:
providing a switching signal to a first controller of the inverter circuit to provide a short circuit path across a first diode of the first controller circuit; and
providing a switching signal to a second controller of the inverter circuit to provide a short circuit path across a second diode of the first controller circuit, where the first and the second controllers of the inverter circuit are electrically coupled in a push-pull configuration.

59. The method of claim 56 wherein charging the inductor includes:

providing a switching signal to a first controller of the inverter circuit to provide a short circuit path across a first diode of the first controller circuit; and providing a switching signal to a second controller of the inverter circuit to provide a short circuit path across a second diode of the first controller circuit, where the first and the second controllers of the inverter circuit are electrically coupled in an L-type configuration.

60. The method of claim 56 wherein charging the inductor includes:

providing a switching signal to a first controller of the inverter circuit to provide a short circuit path across a first diode of the first controller circuit; and providing a switching signal to a second controller of the inverter circuit to provide a short circuit path across a second diode of the first controller circuit;

providing a switching signal to a third controller of the inverter circuit to provide a short circuit path across a third diode of the first controller circuit; and providing a switching signal to a fourth controller of the inverter circuit to provide a short circuit path across a fourth diode of the first controller circuit, where the first, the second, the third and the fourth diodes are electrically coupled as a bridge.

61. The method of claim 56 wherein shorting the second side of the transformer includes:

providing a switching signal to a first controller of the rectifier circuit to provide a short circuit path across a first diode of the rectifier circuit; and at approximately a same time, providing a switching signal to a second controller of the rectifier circuit to provide a short circuit path across a second diode of the rectifier circuit, where a first pole of the first diode of the rectifier circuit is connected to a first pole of the second diode of the rectifier circuit, the first poles of the first and the second diodes of the rectifier circuit having a same polarity.

62. The method of claim 56 wherein providing the DC voltage to the first side of the transformer having the first polarity includes:

providing a switching signal to a first controller of the inverter circuit to remove a short circuit path across a first diode of the inverter circuit.

63. The method of claim 56 wherein providing the DC voltage to the first side of the transformer having the first polarity includes:

providing a switching signal to a first controller of the inverter circuit to remove short circuit path across a first diode of the inverter circuit; and at approximately a same time, providing a switching signal to a third controller of the inverter circuit to remove a short circuit path across a third diode of the inverter circuit, the first and the third diodes of the inverter circuit diagonally opposed to one another across a bridge.

64. The method of claim 57, wherein providing the DC voltage to the first side of the transformer having the first polarity includes:

providing a switching signal to a first controller of the inverter circuit to remove a short circuit path across a first diode of the inverter circuit; and at approximately a same time, providing a switching signal to a third controller of the inverter circuit to remove a short circuit path across a third diode of the inverter circuit, the first and the third diodes of the inverter circuit diagonally opposed to one another across a bridge, and wherein providing the DC voltage to the first side of the transformer having the second polarity includes:

providing a switching signal to a second controller of the inverter circuit to remove a short circuit path across a second diode of the inverter circuit; and at approximately a same time, providing a switching signal to a fourth controller of the inverter circuit to remove a short circuit path across a fourth diode of the inverter circuit, the second and the fourth diodes of the inverter circuit diagonally opposed to one another across the bridge.

* * * * *